J. F. O'CONNOR.
HIGH CAPACITY FRICTION BUFFER.
APPLICATION FILED MAR. 18, 1915.
1,203,248.
Patented Oct. 31, 1916.
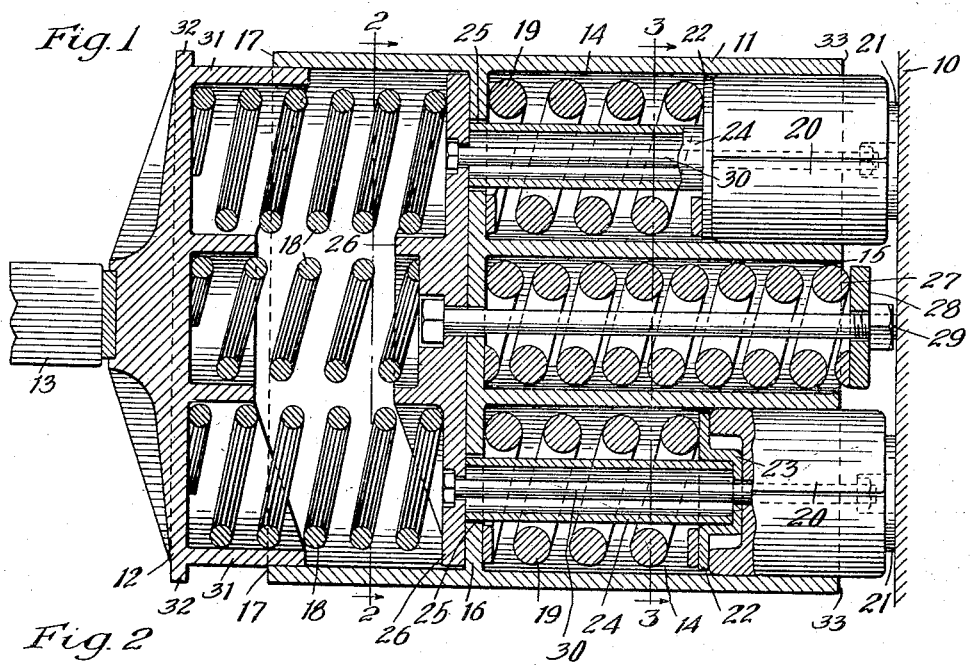
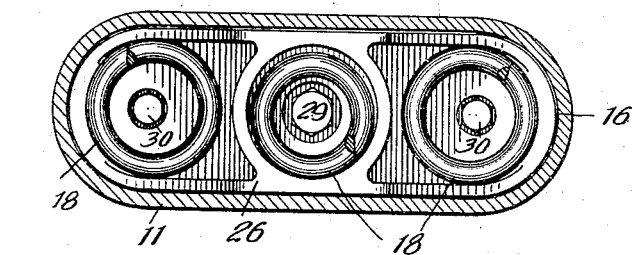
WITNESSES:
INVENTOR.
John F. O'Connor
BY George J. Haight
his ATTORNEY

UNITED STATES PATENT OFFICE.

JOHN F. O'CONNOR, OF CHICAGO, ILLINOIS, ASSIGNOR TO WILLIAM H. MINER, OF CHAZY, NEW YORK.

HIGH-CAPACITY FRICTION-BUFFER.

1,203,248.  Specification of Letters Patent.  Patented Oct. 31, 1916.

Application filed March 18, 1915. Serial No. 15,342.

*To all whom it may concern:*

Be it known that I, JOHN F. O'CONNOR, a citizen of the United States, residing at Chicago, in the county of Cook and State of Illinois, have invented a certain new and useful Improvement in High-Capacity Friction-Buffers, of which the following is a full, clear, concise, and exact description, reference being had to the accompanying drawings, forming a part of this specification.

This invention relates to improvements in high capacity friction buffers.

An object of the invention is to provide a buffer for railway cars and having a preliminary spring action and a high capacity combined spring and friction main shock absorbing action.

Another object of the invention is to provide a shock absorbing member having a main shock absorbing element and a preliminary spring element so arranged that the preliminary spring element is actuated separately prior to the actuation of the main shock absorbing means and also simultaneously with the actuation of the latter.

The invention furthermore consists in the improvements in the parts and devices and in the novel combinations of the parts and devices, as herein shown, described or claimed.

Figure 1 is a longitudinal, horizontal sectional view of a buffer embodying my improvements; Fig. 2 is a transverse, vertical sectional view taken on the line 2—2 of Fig. 1; and Fig. 3 is a view similar to Fig. 2 taken on the line 3—3 of Fig. 1.

In the drawing forming a part of this specification, 10 denotes a fixed abutment of a car underframe; 11 a casting; 12 a follower telescoped with said casting 11; and 13 a buffer stem. The casting 11, as shown, is provided with two outside, parallelly arranged, combined spring and friction chamber 14—14 between which is located a central main spring chamber 15. Each of the chambers 14—14 and 15 has a closed end formed by the wall or partition 16 casting integrally with the rest of the casting 11, said wall or partition 16 being located a substantial distance from the outer end 17 of the casting 11 to thereby form a chamber within which are mounted three parallelly arranged preliminary springs 18—18. Mounted in each combined spring and friction chamber 14 is a spring 19 and friction devices comprising a plurality of friction shoes 20, wedge 21 and spring cap or follower 22, the latter having a cup shaped portion 23 in which is seated the end of a tube 24, the tubes 24 being disposed axially of the springs 19 and having their outer ends passing through perforations 25 in the partition 16. The outer ends of the tubes 24 bear against a movable follower or partition 26 which is normally seated against the relatively fixed partition 16 and is so formed as to provide three seats for the three preliminary springs 18—18. In the spring chamber 15 is mounted a main spring 27 bearing at one end against the partition 16 and at its opposite end against a plate 28 which is retained in position by a bolt 29 extending through perforations in the partition 16 and plate 26, the head of the bolt being seated in a recess in the latter. Other retaining bolts 30 are provided which extend through the friction devices, the hollow tubes 24 and perforations in the follower 26. On its inner face, the follower 12 is provided with an inwardly extending flange 31 corresponding in shape to the contour of the casting 11 and in which it is telescoped. A projecting rib 32 surrounds the follower 12 and is adapted to engage the outer edge 17 of the casting 11 to thereby limit the relative approach of the follower 12 and casting 11. As will be apparent from an inspection of Fig. 1, under normal conditions the distance between the edge 17 and the rib 32 is less than the distance between the inner edge of the flange 31 and the follower or movable partition 26 and the function of this will appear hereinafter.

The operation is as follows: Upon inward movement of the buffer stem 13, the follower 12 is moved inwardly thereby compressing the springs 18 between it and the casting 11 which is held relatively stationary during this period of the operation, due to the greater resistance of the main spring and friction mechanisms. This independent movement of the follower 12 continues until it engages the outer edge of the casting 11 whereupon the latter moves in unison with the follower 12. As the casting now moves inwardly, the wedges of the friction mechanisms remain stationary and the friction shells slide over the friction shoes, the pressure gradually increasing, due to the increasing pressure of the springs 19 against the shoes through the spring caps 22. As will be understood, the longitudinal movement of the friction shoes 20 is very slight and consequently the tubes 24—24 will also be held practically stationary. This prevents inward movement of the movable partition 26 and consequently during the movement of the casting 11 the preliminary springs 18 are thereby compressed and the final limit of their compression is attained when the inner edge of the flange 31 comes in contact with the follower 26, which in actual practice will be so designed as to be simultaneous with the engagement of the inner edge 33 of the casting 11 with the abutment 10. During the above described operation it is, of course, apparent that the spring 15 is being also compressed.

Although I have herein shown and described in detail what I now consider the preferred embodiment of my improvement, yet it will be understood that changes and modifications may be made therein without departing from the spirit of the invention and all such changes and modifications are contemplated as come within the scope of the claims appended hereto.

I claim:—

1. In a buffer, the combination with a plurality of friction and main spring chambers arranged side by side, of spring and friction mechanism in each friction chamber, a spring in the main spring chamber, and preliminary springs outside of said friction and main spring chambers.

2. In a buffer, the combination with a casing having two integral outside friction shells and a central spring chamber arranged parallelly, of spring and friction mechanism in each shell, a spring in the spring chamber, and means for actuating the friction mechanism and spring simultaneously.

3. In a shock absorbing device, the combination with two telescoped members, one of which is provided with a friction shell and a partition fixed with respect thereto, of friction devices mounted within said shell, a spring between said devices and said relatively fixed partition, a preliminary spring between said telescoped members, said preliminary spring being compressed a predetermined amount prior to the actuation of the friction mechanism, and means for continuing the compression of said preliminary spring during the actuation of the friction devices.

4. In a shock absorbing device, the combination with two telescoped members, one of which is provided with a friction shell and a partition fixed with respect thereto, of friction devices mounted within said shell, a spring between said devices and said relatively fixed partition, a preliminary spring between said telescoped members, said preliminary spring being compressed a predetermined amount prior to the actuation of the friction mechanism, and means for continuing the compression of said preliminary spring during the actuation of the friction devices, said means including a movable partition between said fixed partition and adjacent end of the preliminary spring, and a plunger between said movable partition and the friction devices.

5. In a shock absorbing device, the combination with a casting having a combined friction shell and spring chamber closed at one end, of friction devices coöperable with said shell, a spring between said devices and the closed end of the shell, a follower, a preliminary spring between said follower and said closed end, means limiting the relative approach of said follower and said casting, and means for continuing the compression of the preliminary spring after the relative approach of said follower and casting has ceased and while the friction mechanism is being actuated.

6. In a shock absorbing device, the combination with a casting having a combined friction shell and spring chamber closed at one end, of friction devices coöperable with said shell, a spring between said devices and the closed end of the shell, a follower, a preliminary spring between said follower and said closed end, means limiting the relative approach of said follower and said casting, and means for continuing the compression of the preliminary spring after the relative approach of said follower and casting has ceased and while the friction mechanism is being actuated, said means including a movable follower between said closed end of the shell and adjacent end of the preliminary spring and a rigid member interposed between said last named follower and the friction devices.

7. In a buffer, the combination with a fixed abutment, of a follower, a bodily movable casting having a plurality of friction shells formed therein, friction devices coöperable with said shells, preliminary springs between said casting and said follower, and means for compressing said preliminary springs during the movement of said casting.

8. In a buffer, the combination with a casting, of a follower telescoped with said casting, preliminary springs between said casting and said follower, means limiting the relative approach of said follower and casting, friction shells formed integrally with said casting and arranged parallelly, friction devices within said shells, a main spring mounted between said friction shells, and means for compressing said preliminary springs after the relative approach of said follower and casting has ceased.

JOHN F. O'CONNOR.

Witnesses:
 CARRIE G. RANZ,
 GEORGIE VICKERY.

Copies of this patent may be obtained for five cents each, by addressing the "Commissioner of Patents, Washington, D. C."